United States Patent
Liu et al.

(10) Patent No.: US 7,357,691 B2
(45) Date of Patent: *Apr. 15, 2008

(54) METHOD FOR DEPOSITING CARBON NANOTUBES ON A SUBSTRATE OF A FIELD EMISSION DEVICE USING DIRECT-CONTACT TRANSFER DEPOSITION

(75) Inventors: Liang Liu, Beijing (CN); Shou Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 145 days.

This patent is subject to a terminal disclaimer.

(21) Appl. No.: 10/811,415

(22) Filed: Mar. 26, 2004

(65) Prior Publication Data

US 2004/0209385 A1    Oct. 21, 2004

(30) Foreign Application Priority Data

Mar. 27, 2003    (CN)    ............................. 2003 1 14068

(51) Int. Cl.
   *H01J 9/00*    (2006.01)
   *H01J 9/02*    (2006.01)

(52) U.S. Cl. ........................... 445/50; 445/51; 445/14; 445/24; 156/230; 156/237

(58) Field of Classification Search ............ 445/49–51, 445/24, 25
   See application file for complete search history.

(56) References Cited

U.S. PATENT DOCUMENTS

| | | | |
|---|---|---|---|
| 6,183,714 B1 * | 2/2001 | Smalley et al. ......... | 423/447.3 |
| 6,232,706 B1 * | 5/2001 | Dai et al. .................... | 313/309 |
| 6,282,226 B1 * | 8/2001 | Furukawa ..................... | 372/94 |
| 6,312,303 B1 * | 11/2001 | Yaniv et al. .................. | 445/24 |
| 6,515,415 B1 | 2/2003 | Han et al. | |
| 2002/0042241 A1 * | 4/2002 | Hsu ............................. | 445/24 |
| 2003/0027478 A1 * | 2/2003 | Park et al. .................... | 445/24 |
| 2003/0044537 A1 | 3/2003 | Chang et al. | |
| 2003/0049381 A1 * | 3/2003 | Mirkin et al. ............... | 427/402 |
| 2004/0150311 A1 * | 8/2004 | Jin .............................. | 313/309 |
| 2004/0192152 A1 * | 9/2004 | Liu et al. ..................... | 445/51 |

FOREIGN PATENT DOCUMENTS

| | | | |
|---|---|---|---|
| EP | 1129990 A1 * | | 9/2001 |
| JP | 2001220674 A * | | 8/2001 |
| JP | 2004241295 A * | | 8/2004 |
| JP | 2004284938 A * | | 10/2004 |
| JP | 2004338982 A * | | 12/2004 |
| JP | 2006008473 A * | | 1/2006 |

\* cited by examiner

*Primary Examiner*—Mariceli Santiago
(74) *Attorney, Agent, or Firm*—Wei Te Chung

(57) ABSTRACT

A preferred method for making a carbon nanotube-based field emission device in accordance with the invention includes the following steps: providing a substrate (22) with a surface; depositing a catalyst layer (24) on a predetermined area on the surface of the substrate; forming a carbon nanotube array (30) extending from the predetermined area; forming a cathode electrode (40) on top of the carbon nanotube array; and removing the substrate so as to expose the carbon nanotube array.

4 Claims, 3 Drawing Sheets

METHOD FOR DEPOSITING CARBON NANOTUBES ON A SUBSTRATE OF A FIELD EMISSION DEVICE USING DIRECT-CONTACT TRANSFER DEPOSITION

BACKGROUND OF THE INVENTION

1. Field of the Invention

The present invention relates to a method for making a field emission device, and more particularly to a method for making a carbon nanotube-based field emission device.

2. Description of Prior Art

Carbon nanotubes are a novel carbonaceous material discovered by Iijima, a researcher of NEC corporation, in 1991. Relevant information was reported in an article by Iijima, entitled "Helical Microtubules of Graphitic Carbon" (Nature, Vol. 354, P56, 1991). Carbon nanotubes can transmit an extreme high electrical current and emit electrons at a very low voltage of less than 100 volts, which make it a very promising potential material for field emission applications.

Referring to FIG. 12, U.S. Pat. No. 6,232,706, invented by Hongjie Dai et al., discloses a field emission device using aligned parallel bundles of carbon nanotubes 200 extending from patterned catalyst layers 230 deposited on a layer of porous silicon 220 which formed on a substrate 210 using a chemical vapor deposition (CVD) process. The carbon nanotubes produced by the CVD process have a variety of heights in a wide range so that the bundles of carbon nanotubes can form a flat top, a bow-shaped top, or other shapes, which are neither predictable nor controllable. Also, a thin layer including disorderly nanotubes, a certain amount of remaining catalyst particles, and amorphous carbon material may be produced on the top of the bundles. All of the above defects may reduce the uniformity and stability of electron emissions from the bundles of carbon nanotubes.

SUMMARY OF THE INVENTION

Accordingly, an object of the present invention is to provide a method for making a carbon nanotube-based field emission device with a flat electron emitting surface.

Another object of the present invention is to provide a method for making a carbon nanotube-based field emission device which can emit electrons more uniformly.

In order to achieve the objects set above, a preferred method for making a carbon nanotube-based field emission device in accordance with the present invention comprises the following steps: providing a substrate with a surface; depositing a catalyst layer on a predetermined area on the surface of the substrate; forming a carbon nanotube array extending from the predetermined area; forming a cathode electrode on top of the carbon nanotube array; and removing the substrate so as to expose the carbon nanotube array. A flatness of the surface of the substrate is less than 1 micron so that a bottom surface of the carbon nanotube array grown therefrom has the same flatness. Thus, the improved flatness and the absence of disorderly nanotubes, remaining catalyst, and amorphous carbon materials improves electron emission uniformity.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
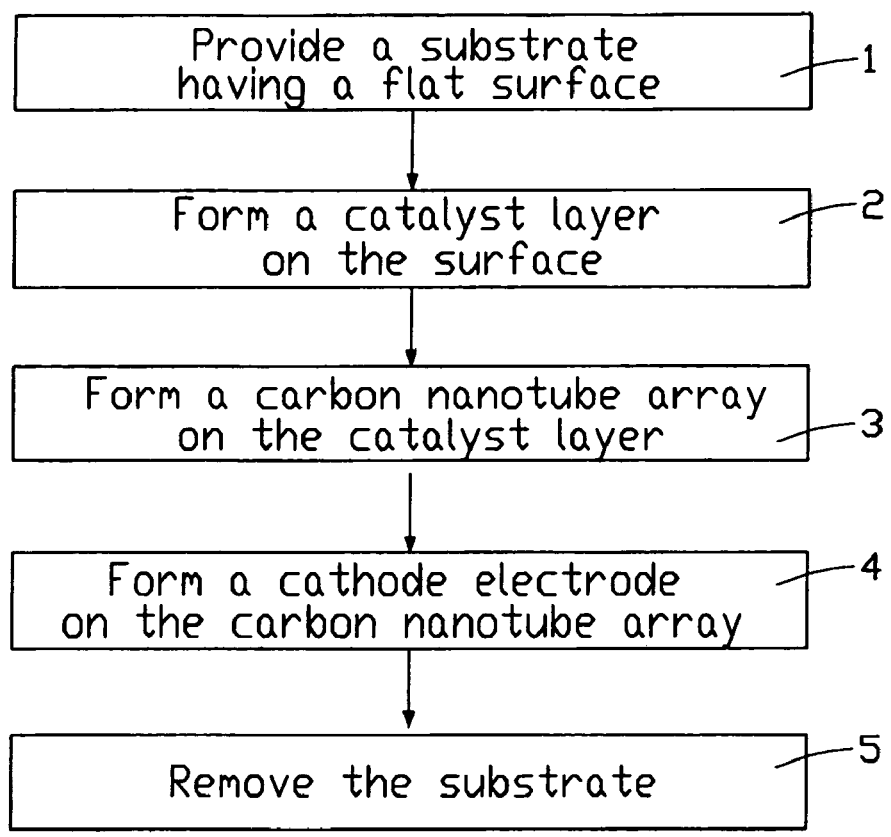
FIG. 1 is a flow chart of a method for making a carbon nanotube-based field emission device in accordance with a preferred embodiment of the invention.

A preferred method for making a carbon nanotube-based field emission device in accordance with the invention will be described below with reference to FIG. 1.

Step 1 is providing a substrate having a flat surface. A variation in flatness of the surface is less than 1 micron.

Step 2 is forming a layer of catalyst on the surface of the substrate. Generally, the catalyst is a transition metal such as Fe (iron), Co (cobalt), Ni (nickel) or an alloy thereof. A thickness of the layer of catalyst is in the range from 1 nm to 10 nm, and preferably in the range from 3 nm to 5 nm. Further, the layer of catalyst is preferably annealed at a temperature of 300~400 degree.

Step 3 is forming a carbon nanotube array on the layer of catalyst. A preferred chemical vapor deposition process for growing the carbon nanotube array includes the following steps: introducing flowing carbon-containing gas such as ethylene or acetylene, heating the flowing carbon-containing gas to a temperature of about 700 degree, and producing the carbon nanotube array on the layer of catalyst.

Step 4 is forming a cathode electrode on a top of the carbon nanotube array. Generally, the forming of the cathode electrode employs a coating process or a chemical deposition of a metallic material.

Step 5 is removing the substrate so as to expose a bottom surface of the carbon nanotube array. Preferably, the exposed bottom surface of the carbon nanotube array is treated by applying laser irradiation thereto. This cleans the surface and improves its electron emission performance.

Accordingly, the exposed bottom surface of the carbon nanotube array has the same flatness as the surface of the substrate.

Figure 2:
FIG. 2 is a schematic, side elevation view of a working plate having a number of grooves of small size therein according to a first embodiment.

Referring to FIG. 2, a working plate 20 is provided with a plurality of parallel, small-sized grooves 201 defined in a surface thereof. The grooves 201 facilitate subsequent removal of the working plate 20. The working plate 20 can be a metallic material or a nonmetallic material, so long as it is sufficiently heat stable to endure the high temperatures at which carbon nanotubes are produced. In order to flatten the surface of the working plate 20, the grooves 201 are filled with an easily removable material, such as wax (not labeled).

Figure 3:
FIG. 3 is a schematic, side elevation view of a substrate formed on the working plate of FIG. 2.

Referring to FIG. 3, a silicon oxide layer 22 is deposited on the working plate 20 to a thickness sufficient for subsequent growing of carbon nanotubes therefrom. The thickness of the silicon oxide layer 22 is commonly in the range from 1 micron to 1000 microns, and preferably in the range from 10 microns to 200 microns. The silicon oxide layer 22 has a flat surface and is removable by an etching process. A variation in flatness of the surface is less than 1 micron.

Figure 4:
FIG. 4 is a schematic, side elevation view of a catalyst layer deposited on the substrate of FIG. 3.

Referring to FIG. 4, a layer of catalyst 24 is deposited on the silicon oxide layer 22 to a thickness in the range from 1 nm to 10 nm. The catalyst is selected from Fe, Co, Ni or an alloy thereof.

Figure 5:
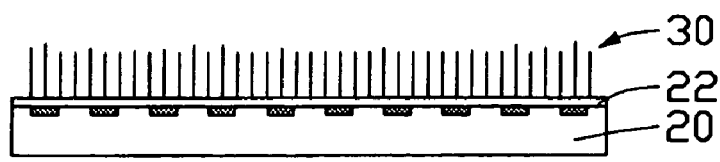
FIG. 5 is a schematic, side elevation view of a carbon nanotube array grown from the catalyst of FIG. 4.

Referring to FIG. 5, a carbon nanotube array 30 is grown from the layer of catalyst 24. The carbon nanotube array 30 is produced by a chemical vapor deposition process, and a height of the carbon nanotube array 30 is controlled to meet the requirements of field emission in use. The height is preferably in the range from 10 microns to 500 microns.

Figure 6:
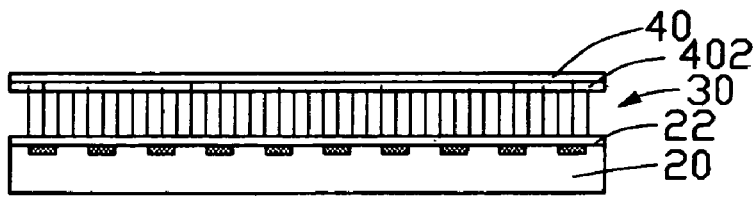
FIG. 6 is a schematic, side elevation view of a cathode electrode formed on top of the carbon nanotube array of FIG. 5.

Referring to FIG. 6, a cathode electrode 40 is formed with a negative feedback layer 402 on a top of the carbon nanotube array 30, so that the carbon nanotube array 30 is in electrical contact with the cathode electrode 40 via the negative feedback layer 402. The negative feedback layer 402 is made of a material having a suitable resistance, such as silicon or alloys having a resistance in the range from several ohms to hundreds of ohms. The cathode electrode 40 is made of a metallic material having a heat expansion coefficient compatible with that of the negative feedback layer 402.

Figure 7:
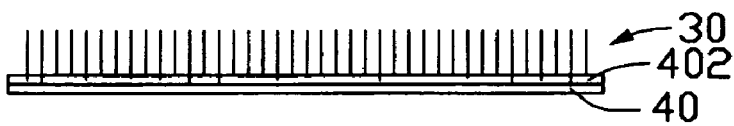
FIG. 7 is a schematic, side elevation view of the assembly of FIG. 6 after removing the working plate and substrate.

Referring to FIG. 7, the working plate 20 and the silicon oxide layer 22 are respectively removed, so that a surface of the carbon nanotube array 30 is exposed. Simply, the working plate 20 can be removed easily by applying an external force thereto with the facilitation of the groves 201 and wax therein. Then, the silicon oxide layer 22 can be removed by an etching process. Furthermore, if necessary, the exposed surface of the carbon nanotube array 30 may be treated with laser irradiation in order to clean the surface.

Figure 8:
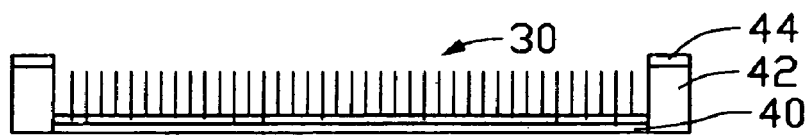
FIG. 8 is a schematic, side elevation view of a pair of gate electrodes formed on insulative spacers formed respectively on two sides of the obtained structure of FIG. 7.

Referring to FIG. 8, two gate electrodes 44 are disposed adjacent to the carbon nanotube array 30 at appropriate positions, each of the gate electrodes 44 being formed on a respective insulative spacer 42. Therefore, electron emissions from the carbon nanotube array 30 can be controlled by the gate electrodes 44.

Using the above preferred method, the uniformity of the exposed surface of the carbon nanotube array 30 is mainly determined by the flatness of the silicon oxide layer 22.

It should be noted that the working plate 20 and the gate electrodes 44 are both optional for practicing the present invention. In addition, the negative feedback layer 402 is an optional element for adjusting resistance, if necessary.

An alternative method of the present invention will be described below with reference to FIGS. 9 through 11.

Figure 9:
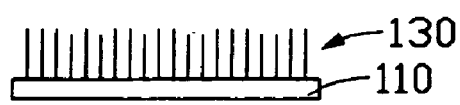
FIG. 9 is a schematic, side elevation view of a carbon nanotube array formed on a substrate in according with a second embodiment of the present invention.

Referring to FIG. 9, a carbon nanotube array 130 is formed on a substrate 110 by a chemical vapor deposition process. The substrate 110 is made of silicon oxide and has a flat surface (not labeled) with a variation in flatness of less than 1 micron. Accordingly, a bottom surface (not labeled) of the carbon nanotube array 130 has a same variation in flatness as that of the surface of the substrate 110.

Figure 10:
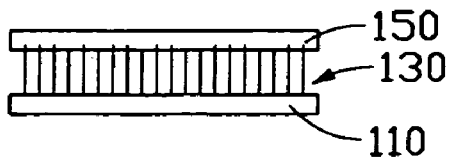
FIG. 10 is a schematic, side elevation view of a cathode electrode formed on top of the carbon nanotube array of FIG. 9.

Referring to FIG. 10, a cathode electrode 150 is formed on a top of the carbon nanotube array 130 by deposition of a metallic material. Thus, the cathode electrode 150 is in electrical contact with the carbon nanotube array 130.

Figure 11:
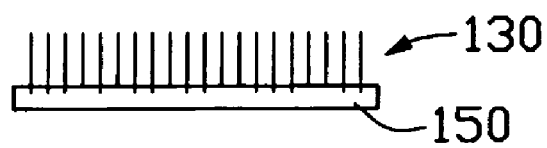
FIG. 11 is a schematic, side elevation view of a carbon nanotube field emission device in accordance with the second embodiment of the present invention.
Figure 12:
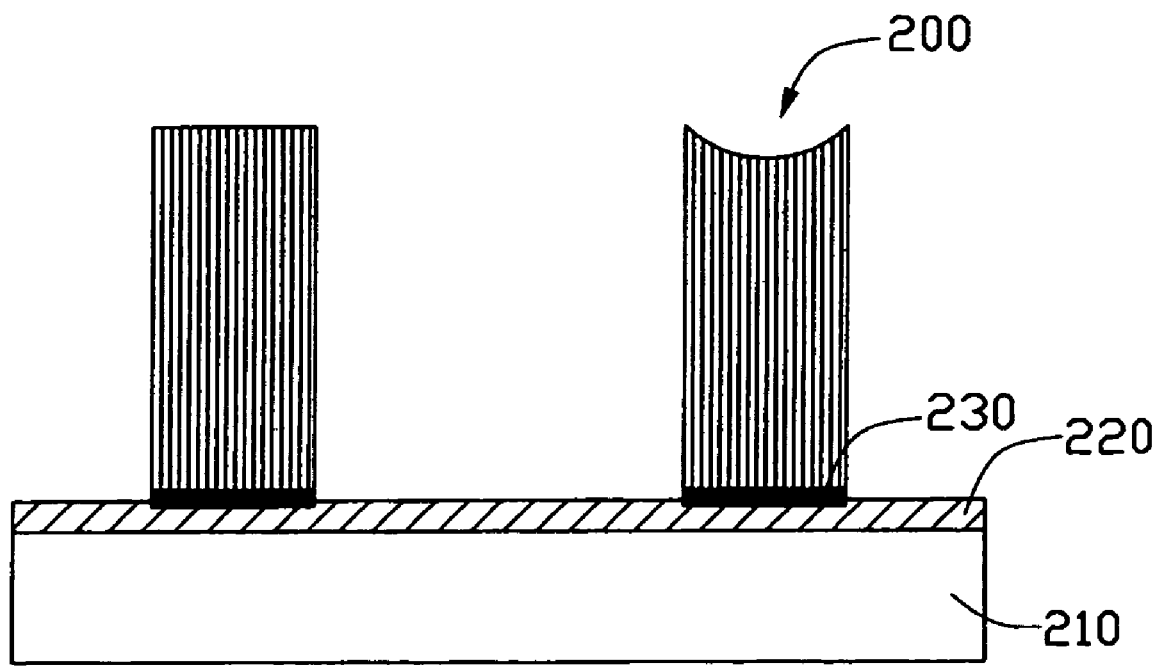
FIG. 12 is a schematic view of a conventional carbon nanotube field emission device.

Referring to FIG. 11, the substrate 110 is removed, thereby obtaining a field emission device having the carbon nanotube array 130 in electrical contact with the cathode electrode 150. In practice, the field emission device may cooperate with other components so that electrons can emit from the carbon nanotube array 130.

It is noted that the substrates 22, 110 are not necessarily limited to being silicon oxide, but can instead be heatproof glass, silicon or other material which is suitable for growing carbon nanotube arrays. Such substitutions of materials are also within the spirit of the present invention.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A method for making a carbon nanotube-based field emission device comprising steps of:
    providing a substrate having a flat surface which has a variation in flatness of less than 1 micron;
    forming a carbon nanotube array extending from a selected area of the surface of the substrate by a chemical vapor deposition process, the carbon nanotube array having a flat bottom surface corresponding to the flat surface of the substrate;
    forming a cathode electrode on a top of the carbon nanotube array; and
    removing the substrate so as to expose the flat bottom surface of the carbon nanotube array so that the flat bottom surface of the carbon nanotube array is thereby configured for acting as an electron emitting surface of the carbon nanotube-based field emission device.

2. The method as described in claim 1, wherein the flat bottom surface of the carbon nanotube array is treated by laser irradiation to clean the flat bottom surface thereof.

3. The method as described in claim 1, wherein the substrate is made of heatproof glass, silicon, or silicon oxide.

4. The method as described in claim 1, wherein further forming at least one gate electrode adjacent to the carbon nanotube array.

* * * * *